Figure 1:
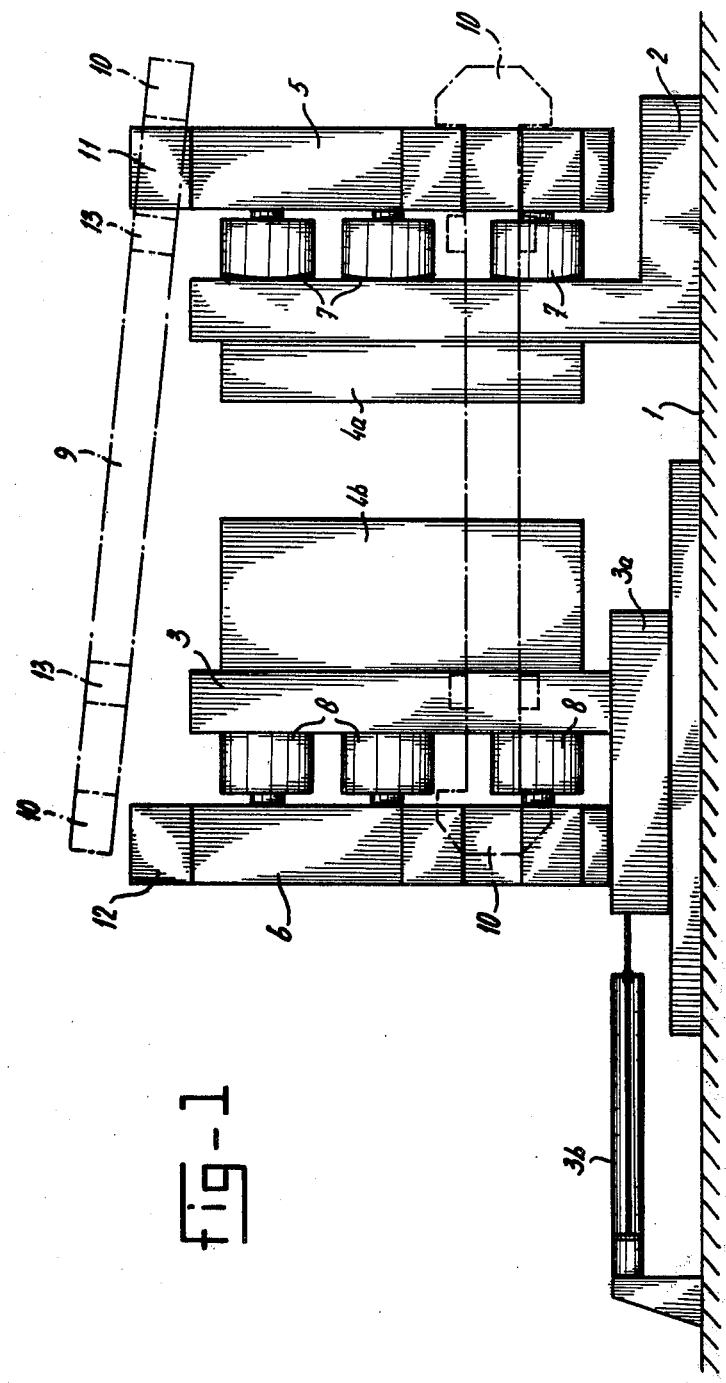

United States Patent [19]

Quéré

[11] 4,148,353

[45] Apr. 10, 1979

[54] CASTING DEVICE

[76] Inventor: Hendrik K. Quéré, Berkensingel 2, Vaassen, Netherlands

[21] Appl. No.: 851,405

[22] Filed: Nov. 14, 1977

[30] Foreign Application Priority Data

Nov. 17, 1976 [NL] Netherlands ................... 7612791

[51] Int. Cl.$^2$ .................... B22D 17/26; B22D 33/04; B22D 17/22
[52] U.S. Cl. .................... 164/341; 164/343; 164/303; 164/347
[58] Field of Search ............ 164/343, 347, 119, 120, 164/137, 339, 341, 342, 312, 303; 425/444, 450.1

[56] References Cited

U.S. PATENT DOCUMENTS

| | | | |
|---|---|---|---|
| 2,916,768 | 12/1959 | Quéré et al. | 164/343 X |
| 3,104,433 | 11/1959 | Hoern | 164/312 |
| 3,434,528 | 3/1969 | McGeeney | 164/339 |
| 3,811,811 | 5/1974 | Horl | 425/444 X |

Primary Examiner—Othell M. Simpson
Assistant Examiner—K. Y. Lin

[57] ABSTRACT

A casting device with a mold section attached to a fixed platen, a mold section attached to a movable platen, a drive unit to move the movable platen in relation to the fixed platen, coupling rods connecting the movable platen to the fixed platen when the two mold sections have fully or closely approached each other and hydraulic pressure mechanisms capable of closing completely the mold sections, and keeping them closed, against the high internal injection pressure. Each platen, on the side removed from the mold sections, is provided with a rigid frame and with a number of hydraulic rams, together forming the above-mentioned hydraulic pressure mechanism, distributed between the platen and its rigid frame and the coupling rods are disconnectably connected with the circumference of both rigid frames so as to connect these frames with compressive stress or tensile strength by means of the double-acting rams, when the mold sections have fully or closely approached each other.

5 Claims, 9 Drawing Figures

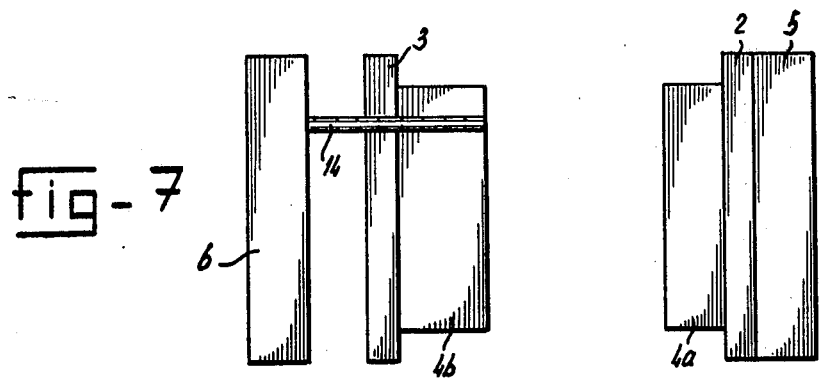
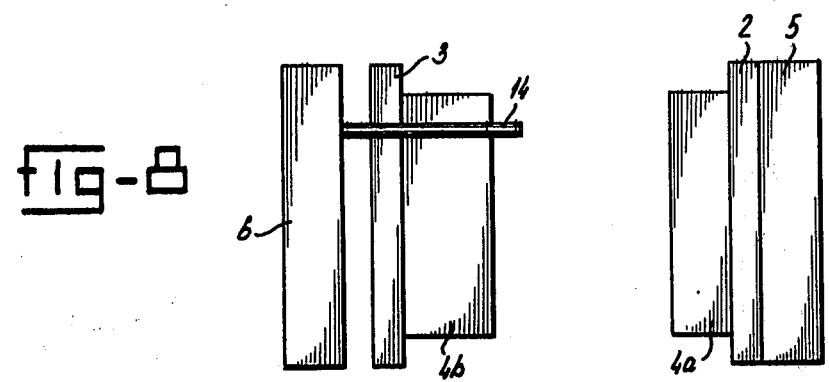
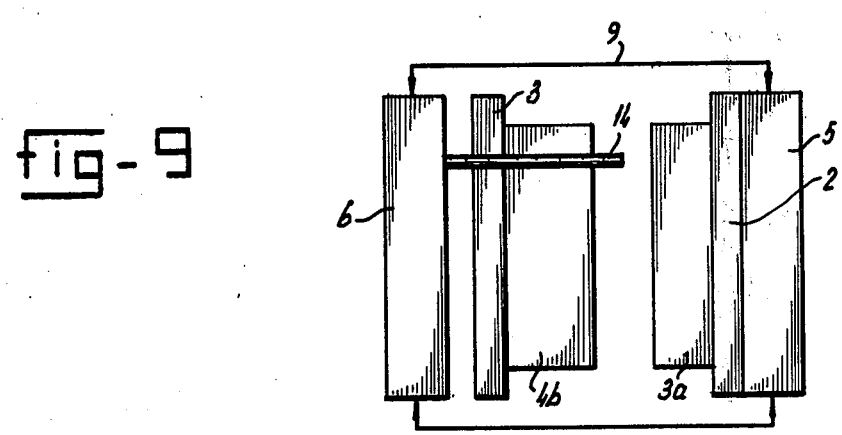

CASTING DEVICE

The invention in question is in respect of a casting device, more in particular a die-casting machine, consisting of a mold section attached to a fixed platen, a mold section attached to a movable platen, a drive unit to move the movable platen in relation to the fixed platen, coupling rods connecting the movable platen to the fixed platen when the two mold sections have fully or closely approached each other and hydraulic pressure mechanisms capable of closing completely the mold sections and keeping them closed against the high internal injection pressure.

A similar casting device is known from Dutch Pat. No. 94.381. Here the coupling rods are permanently connected with the movable platen. The free ends of these coupling rods can, when the two mold sections are in full or near contact, be connected to the fixed platen. The hydraulic pressure mechanisms supplying the closing force form one unit with the coupling rods.

This casting device has various drawbacks.

First, the fixed coupling rods constitute an obstruction in the mounting and dismounting of, at least, the movable mold section.

Secondly, the length of the fixed coupling rods is related to the axial dimensions of the part to be casted and thus to the axial dimensions of one or both mold sections.

Thirdly, the high closing force is transferred to the platens via the coupling rods, so that it bypasses the mold sections. As a result the platens, particularly in the case of big dimensions, have to be very rigid to keep their deflection within permissible limits. Deflection of platens could also cause very narrow gaps to occur between the closing surfaces of the mold sections, with a consequent issue of molding metal in a fluid or plastic state as a result of the high injection pressure. This may result in variations in the dimensions of the casted product. For practical reasons the platens cannot be made too thick, so that, especially in the case of big platens, say platens in excess of 1.000 mms, it is desirable to keep the deflection as small as possible.

The present invention aims at avoiding the drawbacks of the known casting device by providing each platen with a rigid frame on the side removed from the mold sections and with a number of hydraulic rams, together forming the above-mentioned hydraulic pressure mechanism, distributed between at least one platen and its rigid frame; and by connecting the coupling rods disconnectably with the circumference of both rigid frames so as to connect these frames with compressive stress or tensile strain, by means of the double-acting rams when the mold sections have fully or closely approached each other. Thus the coupling rods are not arranged before the mold sections are completely or nearly completely closed. Since they may be removed completely they do not obstruct removal of a mold section.

Longer or shorter coupling rods can be used, as required, without necessitating any alterations to the casting device.

The high closing pressure is transferred via the coupling rods to the rigid frames.

Thus the rams may also be used for opening the two mold sections on completion of the casting and the cooling off of the part to be cast.

The action of the rams is preferably also used to operate the ejecting rods which are to eject the case product from the movable mold section. According to the present invention the ejecting rods are preferably operated by the movable rigid frame, with the rams providing for the movement of the ejecting rods in relation to the movable platen and the movable mold section.

Figure 2:
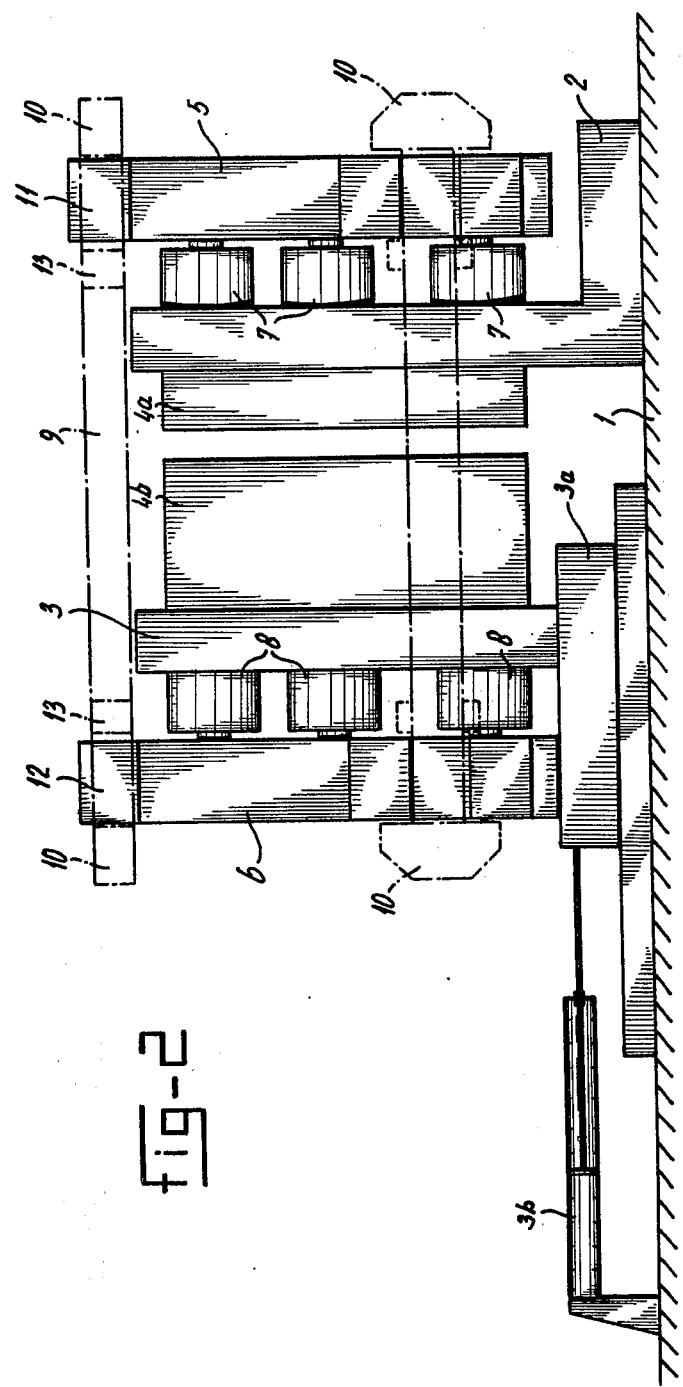
Figure 3:
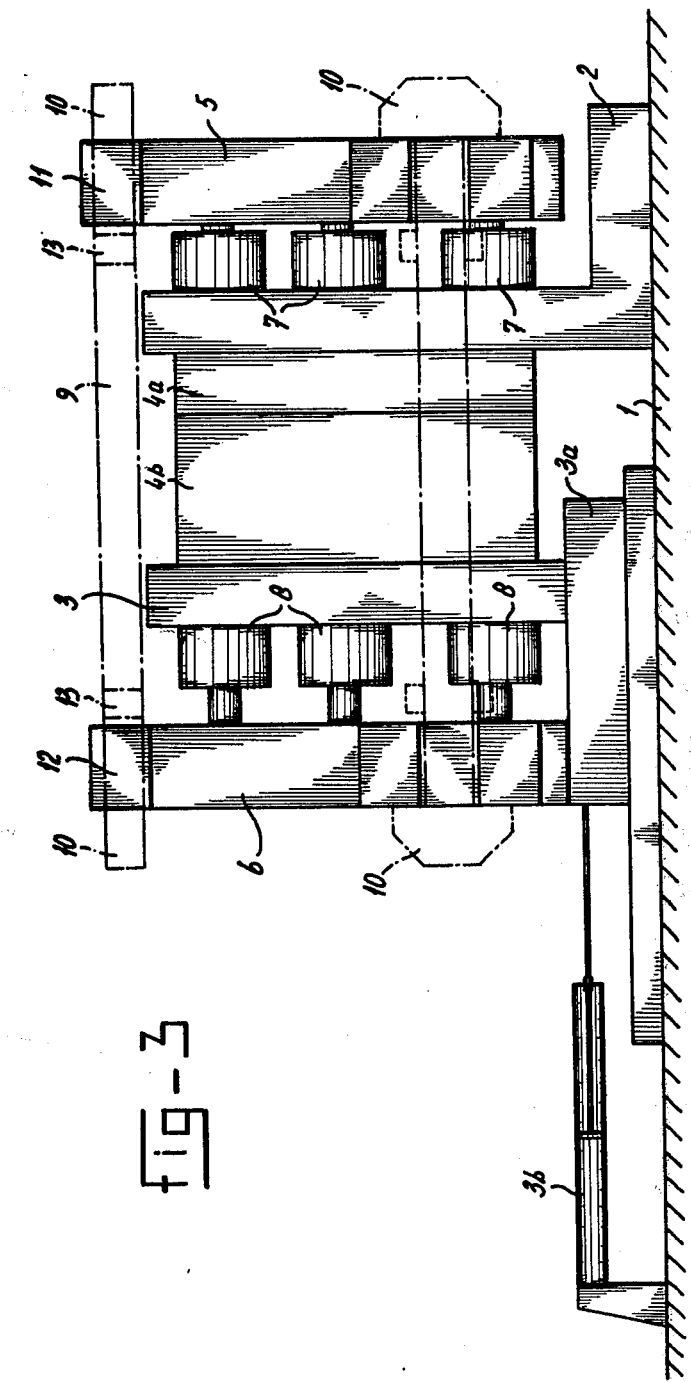

The present invention will now be further elucidated by means of the drawing for an embodiment wherein:

FIG. 1 is a diagram of the die-casting machine according to the present invention in open position;

FIG. 2 a diagram of the die-casting machine according to the present invention in an almost-closed position;

FIG. 3 a diagram of the die-casting machine according to the present invention in closed position; and FIGS. 4–9 show the operation of the ejection rods in different stages.

The die-casting machine according to the present invention comprises a bedplate 1, on which is mounted a fixed platen 2. The movable platen 3 is mounted on a slide 3a, which can be made to move over a guideway on bedplate 1 by means of a hydraulic cylinder 3b.

The two mold sections 4a and 4b are connected to platen 2 and platen 3, respectively. It will be clear that for other products to be casted other mold sections 4a and 4b will have to be connected to platens 2 and 3.

Behind each platen 2 and 3 are rigid frames, 5 and 6 respectively. Between platen 2 and rigid frame 5, and distributed over the surface of the platen and of the rigid frame, there are a number of hydraulic rams 7. Between platen 3 and rigid frame 6 there are a number of hydraulic rams 8.

Mold section 4b can be moved towards mold section 4a with the aid of hydraulic cylinder 3b. For reasons to be given later this movement is continued until the closing surfaces of mold sections 4a and 4b have approached each other to a distance of, say, 10 millimeters.

The coupling rods are indicated with numeral 9. When the platens and the rigid frames are, in essence, rectangular in shape for instance two coupling rods 9 are mounted along the upper edges of rigid frames 5 and 6 near the corners and one along each vertical side edge of rigid frames 5 and 6 near the lower corners. The number of coupling rods to be mounted depends on the size of the rigid frames and on the closing pressure to be transferred. Each coupling rod 9 is provided on either end with projections 10, whose cross section shows the form of, say, a hammer head.

In order to enable coupling rods 9 to be connected to rigid frames 5 and 7, the latter have also been provided with projections 11 and 12 along the three side-edges. These three edges of rigid frames 5 and 6 can for instance be crenellated, so that a large number of projections 11 and 12 is formed along the three edges. The coupling rods 9 comprise besides the end projections 10 other projections 13.

When mold sections 4a and 4b have approached each other to the desired distance of, say, 10 millimeters (see FIG. 2), coupling rods 9 can be mounted; projections 10 lying clear of projections 11 and 12 in rigid frames 5 and 6.

In the position shown in FIG. 2 hydraulic liquid under pressure can be let into rams 8 between movable platen 3 and movable rigid frame 6. As a result projections 10 of coupling rods 9 abut projections 11 and 12, respectively, of rigid frames 5, 6, enabling coupling rods to take up tensile force (see FIG. 3). Movable mold section 4b is now moved by means of rams towards stationary mold section 4a, until the two closing surfaces touch each other with the required force.

Unlike the known construction, where the platens tend to deflect, any possible deflection is now made to take place in the much more rigid frames 5 and 6. The closing surfaces of projections 10 of coupling rods 9 against projections 11 and 12 of rigid frames 5 and 6 should preferably be cylindrical. As a result, no bending moments will occur in coupling rods 9.

The construction according to the present invention, therefore, enables hydraulic rams 7 and 8, the number of which can be made to suit the requirements, to be placed against platens 2 and 3 and behind mold sections 4a and 4b. As a result, the bending moments in platens 2 and 3 will become smaller and the platens can consequently be of a lighter construction than is the case in the known construction.

During the injection of fluid or plastic material into the mold cavity recessed in mold sections 4a and 4b, very high pressures develop in this mold cavity. By fitting the rams 7 and 8, deflection of mold sections 4a and 4b is completely or largely prevented. The result is that no gaps occur between the closing surfaces of the two mold sections 4a and 4b through which an issue of material might take place.

To exert closing force between the two mold sections 4a and 4b it is only necessary to have rams 8. The sole purpose of rams 7 is to compensate any deflection of rigid frame 5 that may occur; all they need, therefore, is a very small stroke, say a few mms, and, in addition, they can be of a single-action type.

Rams 8 on the other hand must not only have a certain stroke, they should also be able to provide the closing forces required. However, the stroke of rams 8 can also be relatively small, say a few cms, while these rams 8 should furthermore be of a double-action type to enable clearance to be effected between the mold sections. To maintain parallelism of platen 3 and rigid frame 6 during the action of rams 8, the motions of rams 8, which should preferably be four in number, should be synchronised.

After the closing surfaces of mold sections 4a and 4b have made contact with each other rams 7 and 8 should provide the closing force pattern required. By the proper placement of rams 7 and 8 the pressure exerted in the mold cavity by the fluid or plastic material can be compensated in the proper manner. The known construction is less well suited to effect this compensation.

Under certain conditions, in cases where a very small deflection is permissible, the construction described above can have a variant whereby rigid frame 5 and fixed platen 2 form one unit; rams 7 can then be dispensed with.

Another advantage of the above construction is that the rams 8 put movable mold section 4b under load in such a way that the deflection of mold section 4a is followed, and that the gap between the closing surfaces of mold sections 4a and 4b does not reach the critical width at which fluid or plastic material issues from the mold.

After the part to be cast has been molded in the mold cavity and cooled off, mold sections 4a and 4b are opened with the aid of rams 8, which are then put under load in the other direction. This leads again to the situation as in FIG. 2 enabling the coupling rods 9 to be removed.

The coupling rods 9 to be arranged along the upper edges of the rigid frames 5 and 6 may also be hingedly connected over a certain angle to the rigid frame 5. By moving upwards or downwards the left end of both coupling rods by means of a hydraulic ram or without such a ram, both frames 5 and 6 can be made free from each other or can be connected to each other.

The hinge connection must be carried out in such a way that the coupling rods 9 can shift somewhat with respect to the rigid frame 5 so that at closing the tensile forces are again taken up by the end projections 10 and at opening the pressure forces by the further projections 13.

Besides somwhat shiftable the hinge connection must also be easily demountable, so that the coupling rods 9 may be removed completely, when for instance the mold sections 4a and 4b must be mounted or demounted by means of a crane.

The structure of the shiftable and demountable hinge connection is not shown in the drawing, since such a structure is within reach of an expert.

The coupling rods 9 to be arranged along the vertical edges of the rigid frames 5 and 6 may, if desired, be supported parallel to each other, in such a way that they may be moved sidewards. This structure is neither shown in the drawing.

The construction of mold 4a, 4b is usually such that the cast object is retained in mold section 4b. To remove the cast object from mold section 4a great forces are sometimes required. These forces can be supplied by the double-action rams 8.

To remove the cast object from mold section 4b ejecting rods are normally used. In the construction as described here it is possible to operate these ejecting rods by rigid frame 6. In that case a separate ejection cylinder will not be necessary. In the known construction this ejection cylinder drives a plate on which the ejecting rods have been mounted. As these ejecting rods have a pattern which is dictatted by the object to be cast and as the ejection forces are determined by the adhesion of the cast object in the mold cavity of mold section 4b, the pattern of the forces to be supplied by these ejecting rods is often variable. It is therefore desirable, especially in cases where the objects to be cast are of a bigger size, to maintain good parallelism of the connecting plate of the ejecting rods. By having the ejecting rods driven by rigid frame 6 the parallelism of the ejection rods is maintained. It is sufficient that oil under pressure is admitted to rams 8 to move rigid frame 6 to platen 3, and the cast object is ejected from mold section 4b. The operation of the ejecting rods is shown in FIGS. 4–9.

In the FIGS. 4–9 the fixed platen 2 and the fixed rigid frame 5 are shown as one unit. An ejecting rod is indicated with 14. It is obvious that a number of ejecting rods of different length is present, adapted to the mold cavity in the mold section 4b.

The ejecting rod 14 is shiftable in the movable platen 3 and in the movable mold section 4b. The rams 8 are not shown in FIGS. 4–9.

Figure 4:
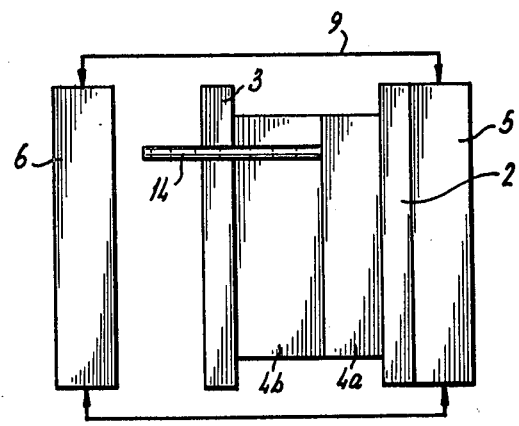

In FIG. 4 the position is shown corresponding to the position shown in FIG. 3. The mold sections 4a and 4b are kept closed with a great force. The trailing ends of the ejecting rods 14 are free of the movable frame 6.

Figure 6:
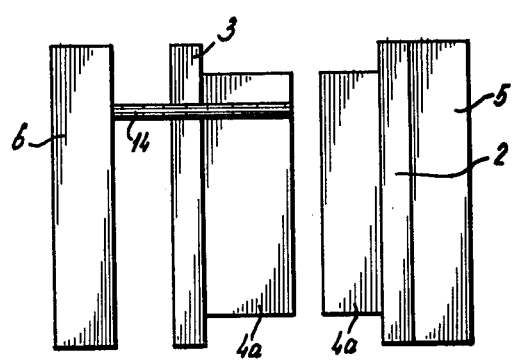

The position according to FIG. 6 corresponds to the position of FIG. 2. The mold sections have been opened initially, whereby the trailing ends of the ejecting rods 14 are just in contact with the rigid frame 6 or are just free of it.

Figure 5:
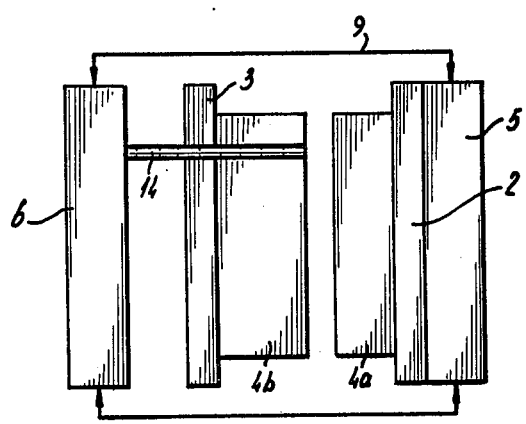

The position of FIG. 6 corresponds to the position of FIG. 5, but the coupling rods 9 are now removed or at least inoperative.

The position of FIG. 7 corresponds to the position of FIG. 1. The movable platen 3, the rigid frame 6 and the movable mold section 4b have been moved to the left by means of the cylinder 3b. The rigid frame 6 has been moved to the right by means of the rams 8 until the position of FIG. 8 has been reached. The ejecting rods 14 have been moved to the right with respect to the mold section 4b and eject the cast object from the mold section 4b.

In order to make usable again the mold the cylinder 3b is again operated until via the position of FIG. 3 the position of FIG. 4 has been reached again.

It is clear that the operation of at least a number of the rams is synchronized.

I claim:

1. A casting device comprising: a mold section attached to a fixed platen, a mold section attached to a movable platen, a drive unit for moving the movable platen in relation to the fixed platen, coupling rods connecting the movable platen to the fixed platen when the two mold sections have fully or closely approached each other, and hydraulic pressure mechanisms capable of closing completely the mold sections, and keeping them closed, against high internal injection pressure, each platen, on the side removed from the mold sections, being provided with a rigid frame and with a number of hydraulic rams, together forming said hydraulic pressure mechanism, and distributed between the platen and its rigid frame, and the coupling rods being disconnectably connected with the circumference of both rigid frames so as to connect these frames with compressive stress or tensile strength by means of the double-acting rams, when the mold sections have fully or closely approached each other.

2. Casting device according to claim 1, wherein the coupling rods on both ends are provided with two sets of projections, which are able to cooperate with projections along the edges of the rigid frames.

3. Casting device according to claim 1 wherein the edges of the rigid frames are crenellated.

4. Casting device according to claim 1, wherein at least a number of the coupling rods at one end are hingeably, shiftably and removably connected with the fixed rigid frame.

5. Casting device according to claim 1, comprising: ejecting rods to enable the cast object to be ejected from the movable mold section, said ejecting rods being operable by the movable rigid frame, with the rams providing for the movement of the ejecting rods in relation to the movable platen and the movable mold section.

* * * * *